United States Patent
Miles

[19]

[11] Patent Number: 6,139,084
[45] Date of Patent: Oct. 31, 2000

[54] ATTACHABLE SUN VISOR EXTENSION

[76] Inventor: C. Jean Miles, 370 E. Benbow, Covina, Calif. 91722

[21] Appl. No.: 09/397,603

[22] Filed: Sep. 16, 1999

[51] Int. Cl.⁷ .......................................................... B60J 3/00
[52] U.S. Cl. ........................................... 296/97.6; 296/97.8
[58] Field of Search .................................... 296/97.6, 97.8

[56] References Cited

U.S. PATENT DOCUMENTS

| | | | |
|---|---|---|---|
| 4,090,732 | 5/1978 | Visititsky | 296/97 C |
| 5,259,657 | 11/1993 | Arendt et al. | 296/97.6 |
| 5,427,427 | 6/1995 | Holter | 296/97.6 |
| 5,445,427 | 8/1995 | Vandagriff | 296/97.6 |
| 5,466,029 | 11/1995 | Zetterlund | 296/97.8 |
| 5,611,590 | 3/1997 | Filgueiras | 296/97.5 |
| 5,662,371 | 9/1997 | Gera et al. | 296/97.8 |
| 5,730,484 | 3/1998 | Robinson | 296/976 |

*Primary Examiner*—D. Glenn Dayoan
*Assistant Examiner*—Lori L. Coletta
*Attorney, Agent, or Firm*—Goldstein & Canino

[57] ABSTRACT

An attachable sun visor extension including a housing securable to a sun visor of a vehicle. A bottom wall of the housing has an elongated slotted opening therethrough exposing a hollow interior of the housing. A front face of the housing has an opening therethrough downwardly of a top wall thereof. An extension plate is slidably disposed within the hollow interior of the housing. The extension plate is dimensioned for sliding outwardly of the elongated slotted opening in the bottom wall of the housing. An upper edge of the extension plate has a pair of laterally extending tabs secured thereto so as to prevent the extension plate from becoming detached from the housing. The upper edge has a pull strap extending upwardly therefrom. The pull strap is extendable outwardly of the opening in the front face of the housing.

4 Claims, 2 Drawing Sheets

ATTACHABLE SUN VISOR EXTENSION

BACKGROUND OF THE INVENTION

The present invention relates to an attachable sun visor extension and more particularly pertains to attaching to a sun visor of a vehicle to provide greater protection against the glare from the sun.

Conventional vehicle sun visors consist of a single panel which can be pivoted to a position in which some of the rays of the sun are prevented from reaching the eyes of the driver and the passenger. In many instances, the early morning and late evening sun reaches a low angle not intercepted by such conventional sun visors. Thus, there is a need for an addition to the conventional sun visor that will extend below the lower edge of the sun visor to intercept the early morning and late evening sun rays.

The present invention attempts to solve the abovementioned problem by providing an attachment for a conventional sun visor that can selectively extend a length of the visor at incremental levels so as to intercept the rays of the sun while at the same time not obstructing the driver's view.

The use of sun visors is known in the prior art. More specifically, sun visors heretofore devised and utilized for the purpose of protecting against the sun's glares are known to consist basically of familiar, expected and obvious structural configurations, notwithstanding the myriad of designs encompassed by the crowded prior art which have been developed for the fulfillment of countless objectives and requirements.

By way of example, U.S. Pat. No 5,611,590 to Filgueiras discloses a sun visor comprised of a plurality of securing straps using hook and loop fasteners, for coupling to the roll bar of a vehicle. U.S. Pat. Nos. 4,090,732 to Vistitsky and 5,730,484 to Robinson disclose attachable extension for vehicle sun visor devices.

While these devices fulfill their respective, particular objective and requirements, the aforementioned patents do not describe an attachable sun visor extension for attaching to a sun visor of a vehicle to provide greater protection against the glare from the sun.

In this respect, the attachable sun visor extension according to the present invention substantially departs from the conventional concepts and designs of the prior art, and in doing so provides an apparatus primarily developed for the purpose of attaching to a sun visor of a vehicle to provide greater protection against the glare from the sun.

Therefore, it can be appreciated that there exists a continuing need for a new and improved attachable sun visor extension which can be used for attaching to a sun visor of a vehicle to provide greater protection against the glare from the sun. In this regard, the present invention substantially fulfills this need.

SUMMARY OF THE INVENTION

In the view of the foregoing disadvantages inherent in the known types of sun visors now present in the prior art, the present invention provides an improved attachable sun visor extension. As such, the general purpose of the present invention, which will be described subsequently in greater detail, is to provide a new and improved attachable sun visor extension and method which has all the advantages of the prior art and none of the disadvantages.

To attain this, the present invention essentially comprises a housing securable to a sun visor of a vehicle. The housing has a generally rectangular configuration. The housing is defined by a top wall, a bottom wall, a front face, a back face, and opposed side walls. The bottom wall has an elongated slotted opening therethrough exposing a hollow interior of the housing. The housing has a pair of securement straps secured thereto inwardly of the opposed side walls. The securement straps each have opposed free ends with corresponding hook and loop straps thereon for securing the housing to the sun visor. The front face has an opening therethrough downwardly of the top wall thereof. An extension plate is slidably disposed within the hollow interior of the housing. The extension plate has a generally rectangular configuration defined by an upper edge, a lower edge, and opposed side edges. The upper edge is dimensioned for sliding outwardly of the elongated slotted opening in the bottom wall of the housing. The upper edge has a pair of laterally extending tabs secured thereto so as to prevent the extension plate from becoming detached from the housing. The upper edge has a pull strap extending upwardly therefrom. The pull strap is extendable outwardly of the opening in the front face of the housing. The pull strap has hook and loop material disposed thereon for mating with a hook and loop patch positioned on the front face of the housing below the opening therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved attachable sun visor extension which has all the advantages of the prior art sun visors and none of the disadvantages.

It is another object of the present invention to provide a new and improved attachable sun visor extension which may be easily and efficiently manufactured and marketed.

It is a further object of the present invention to provide a new and improved attachable sun visor extension which is of durable and reliable construction.

An even further object of the present invention is to provide a new and improved attachable sun visor extension which is susceptible of a low cost of manufacture with regard to both materials and labor, and which accordingly is then susceptible of low prices of sale to the consuming public, thereby making such an attachable sun visor extension economically available to the buying public.

Even still another object of the present invention is to provide a new and improved attachable sun visor extension for attaching to a sun visor of a vehicle to provide greater protection against the glare from the sun.

Lastly, it is an object of the present invention to provide a new and improved attachable sun visor extension including a housing securable to a sun visor of a vehicle. A bottom wall of the housing has an elongated slotted opening therethrough exposing a hollow interior of the housing. A front face of the housing has an opening therethrough downwardly of a top wall thereof. An extension plate is slidably disposed within the hollow interior of the housing. The extension plate is dimensioned for sliding outwardly of the elongated slotted opening in the bottom wall of the housing. An upper edge of the extension plate has a pair of laterally extending tabs secured thereto so as to prevent the extension plate from becoming detached from the housing. The upper edge has a pull strap extending upwardly therefrom. The pull strap is extendable outwardly of the opening in the front face of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
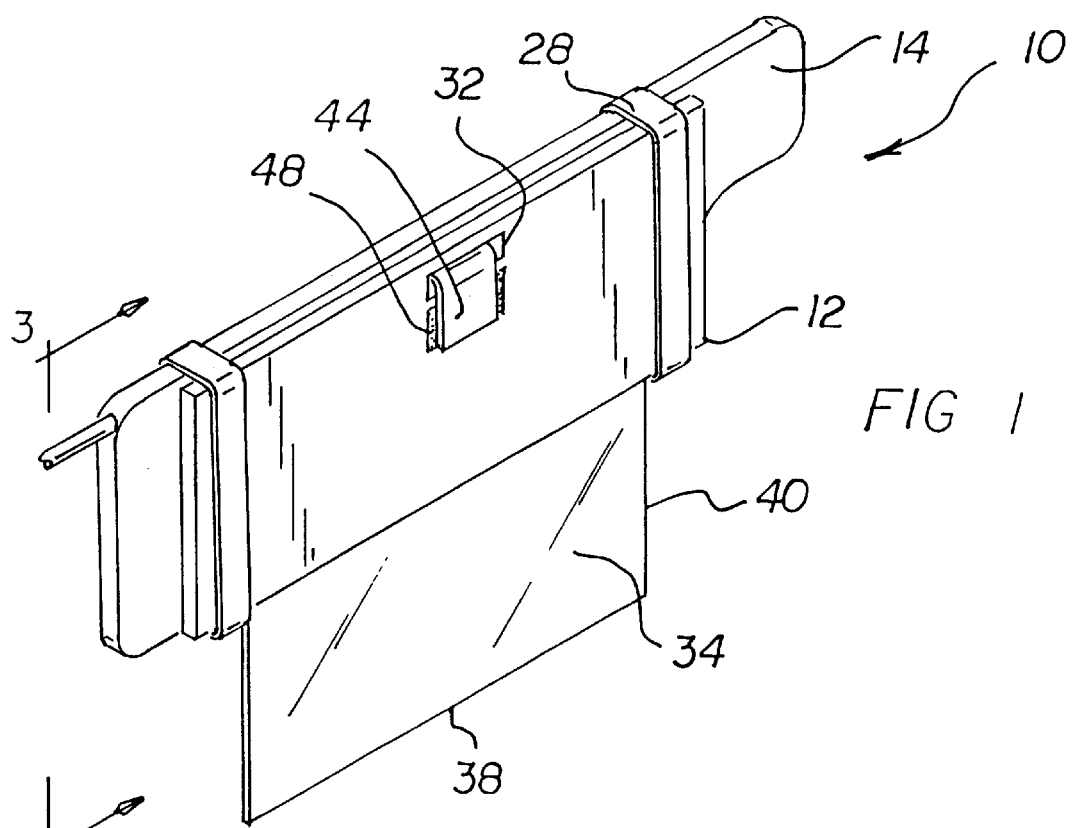
FIG. 1 is a perspective view of the preferred embodiment of the attachable sun visor extension constructed in accordance with the principles of the present invention.
Figure 2:
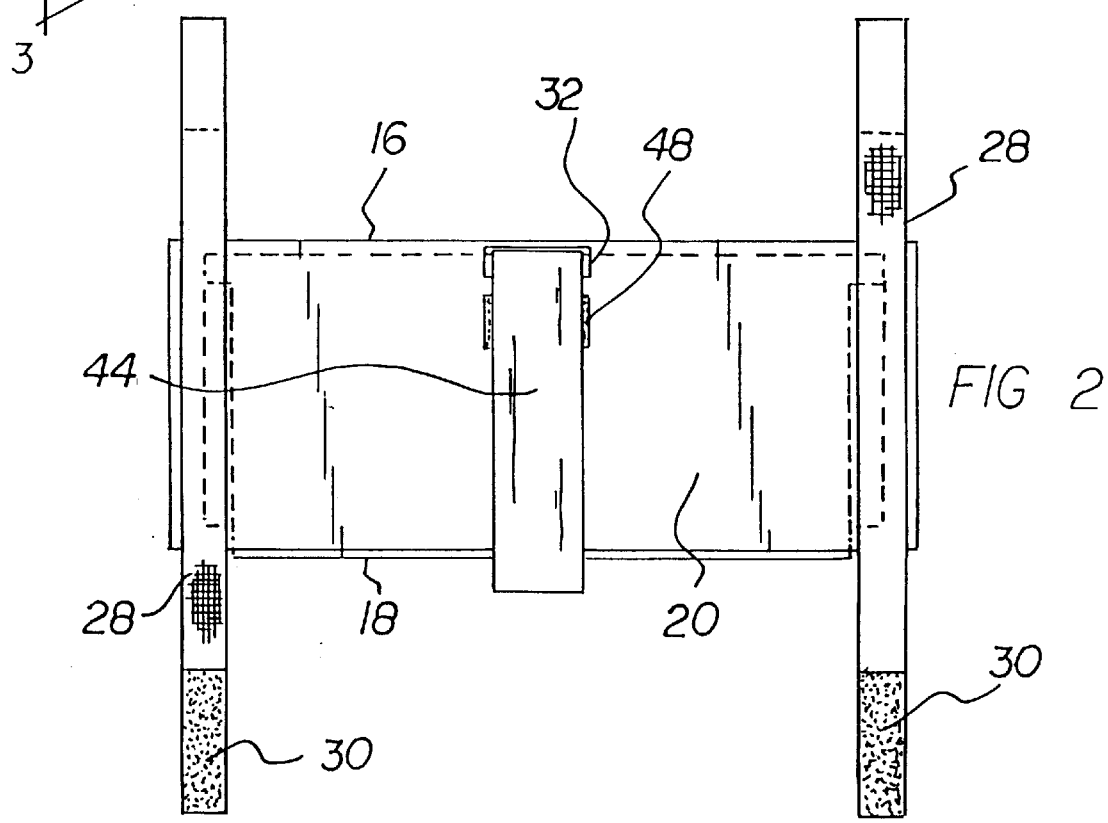
FIG. 2 is a front view of the present invention illustrated in a retracted orientation.
Figure 3:
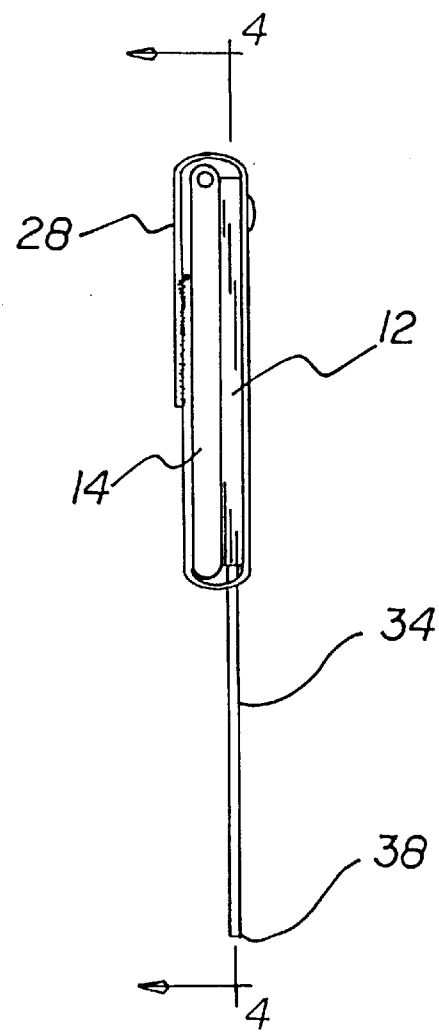
FIG. 3 is a side view of the present invention as taken along line 3—3 of FIG. 1.
Figure 4:
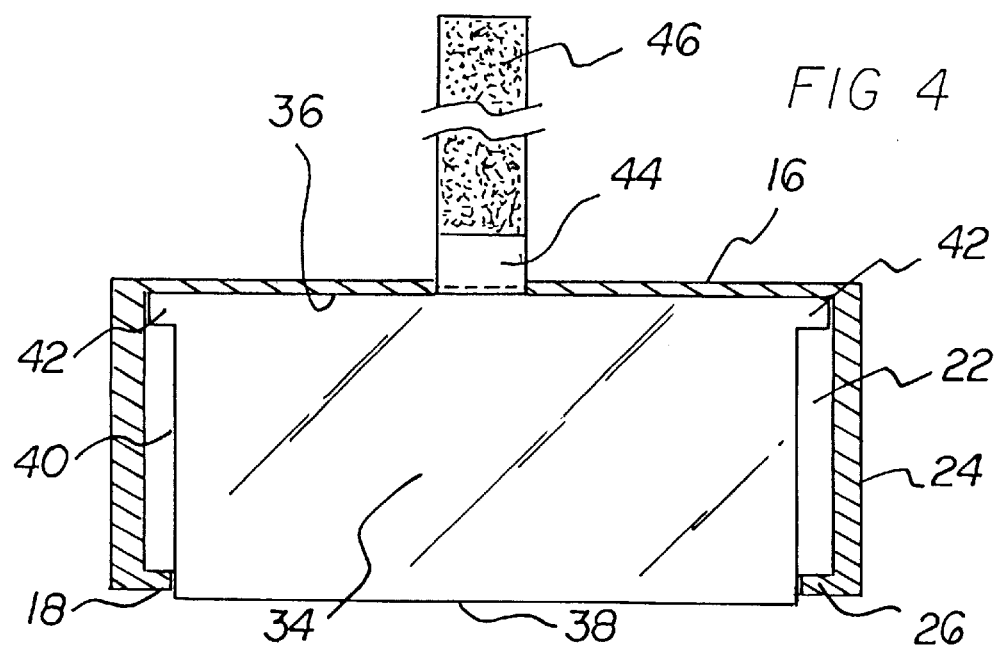
FIG. 4 is a cross-sectional view of the present invention as taken along line 4—4 of FIG. 3.

With reference now to the drawings, and in particular, to FIGS. 1 through 4 thereof, the preferred embodiment of the new and improved attachable sun visor extension embodying the principles and concepts of the present invention and generally designated by the reference number 10 will be described.

Specifically, it will be noted in the various Figures that the device relates to an attachable sun visor extension for attaching to a sun visor of a vehicle to provide greater protection against the glare from the sun. In its broadest context, the device consists of a housing and an extension plate. Such components are individually configured and correlated with respect to each other so as to attain the desired objective.

The housing 12 is securable to a sun visor 14 of a vehicle. The housing 12 has a generally rectangular configuration. The housing 12 is defined by a top wall 16, a bottom wall 18, a front face 20, a back face 22, and opposed side walls 24. The housing 12 has dimensions consistent with the sun visor 14 so as to be concealed when not in use. The bottom wall 18 has an elongated slotted opening 26 therethrough exposing a hollow interior of the housing 12. The housing 12 has a pair of securement straps 28 secured thereto inwardly of the opposed side walls 24. The securement straps 28 each have opposed free ends with corresponding hook and loop straps 30 thereon for securing the housing 12 to the sun visor 14. The front face 20 has an opening 32 therethrough downwardly of the top wall 16 thereof.

The extension plate 34 is slidably disposed within the hollow interior of the housing 12. The extension plate 34 has a generally rectangular configuration defined by an upper edge 36, a lower edge 38, and opposed side edges 40. The upper edge 36 is dimensioned for sliding outwardly of the elongated slotted opening 26 in the bottom wall 18 of the housing 12. The upper edge 36 has a pair of laterally extending tabs 42 secured thereto so as to prevent the extension plate 34 from becoming detached from the housing 12. The upper edge 36 has a pull strap 44 extending upwardly therefrom. The pull strap 44 is extendable outwardly of the opening 32 in the front face 20 of the housing 12. The pull strap 44 has hook and loop material 46 disposed thereon for mating with a hook and loop patch 48 positioned on the front face 20 of the housing 12 below the opening 32 therethrough.

In use, the pull strap 44 is detached from the hook and loop patch 48, which will allow the extension plate 34 to slide freely with respect to the housing 12. Once the desired location of the extension plate 34 has been reached, the pull strap 44 is re-secured to the hook and loop patch 48 so that the position of the extension plate 34 is fixed to combat the ray's of the sun.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An attachable sun visor extension for attaching to a sun visor of a vehicle to provide greater protection against the glare from the sun comprising, in combination:

a housing securable to a sun visor of a vehicle, the housing having a generally rectangular configuration, the housing being defined by a top wall, a bottom wall, a front face, a back face, and opposed side walls, the bottom wall having an elongated slotted opening therethrough exposing a hollow interior of the housing, the housing having a pair of securement straps secured thereto inwardly of the opposed side walls, the securement straps each having opposed free ends with corresponding hook and loop straps thereon for securing the housing to the sun visor, the front face having an opening therethrough downwardly of the top wall thereof;

an extension plate slidably disposed within the hollow interior of the housing, the extension plate having a generally rectangular configuration defined by an upper edge, a lower edge, and opposed side edges, the upper edge being dimensioned for sliding outwardly of the elongated slotted opening in the bottom wall of the housing, the upper edge having a pair of laterally extending tabs secured thereto so as to prevent the extension plate from becoming detached from the housing, the upper edge having a pull strap extending upwardly therefrom, the pull strap being extendable outwardly of the opening in the front face of the housing, the pull strap having hook and loop material disposed thereon for mating with a hook and loop patch positioned on the front face of the housing below the opening therethrough.

2. An attachable sun visor extension for attaching to a sun visor of a vehicle to provide greater protection against the glare from the sun comprising, in combination:

a housing securable to a sun visor of a vehicle, a bottom wall having an elongated slotted opening therethrough exposing a hollow interior of the housing, a front face of the housing having an opening therethrough downwardly of the top wall thereof;

an extension plate slidably disposed within the hollow interior of the housing, the extension plate being dimensioned for sliding outwardly of the elongated slotted opening in the bottom wall of the housing, an upper edge of the extension plate having a pair of laterally extending tabs secured thereto so as to prevent the extension plate from becoming detached from the housing, the upper edge having a pull strap extending upwardly therefrom, the pull strap being extendable outwardly of the opening in the front face of the housing.

3. The attachable sun visor extension as set forth in claim 2 wherein the housing has a pair of securement straps secured thereto, the securement straps each having opposed free ends with corresponding hook and loop straps thereon for securing the using to the sun visor.

4. The attachable sun visor extension as set forth in claim 2 wherein the pull strap has hook and loop material disposed thereon for mating with a hook and loop patch positioned on the front face of the housing below the opening therethrough.

* * * * *